United States Patent
Younes et al.

(10) Patent No.: US 10,560,478 B1
(45) Date of Patent: Feb. 11, 2020

(54) USING LOG EVENT MESSAGES TO IDENTIFY A USER AND ENFORCE POLICIES

(71) Applicant: Palo Alto Networks, Inc., Santa Clara, CA (US)

(72) Inventors: Amro A. Younes, Redwood City, CA (US); Zhipu Jin, Milpitas, CA (US); Martin Walter, Livermore, CA (US); Michael Soren Jacobsen, Mountain View, CA (US); Nicholai Gian Piagentini, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 14/297,583

(22) Filed: Jun. 5, 2014

Related U.S. Application Data

(63) Continuation-in-part of application No. 13/113,939, filed on May 23, 2011.

(51) Int. Cl.
```
H04L 29/06      (2006.01)
G06F 21/30      (2013.01)
H04L 29/08      (2006.01)
```

(52) U.S. Cl.
CPC ............ *H04L 63/20* (2013.01); *G06F 21/30* (2013.01); *H04L 63/10* (2013.01); *H04L 67/14* (2013.01)

(58) Field of Classification Search
CPC ................................. H04L 63/10; G06F 21/30
See application file for complete search history.

(56) References Cited

U.S. PATENT DOCUMENTS

| | | | |
|---|---|---|---|
| 6,088,801 A | 7/2000 | Grecsek | |
| 6,233,616 B1 * | 5/2001 | Reid | H04L 29/12009 709/220 |
| 6,751,634 B1 | 6/2004 | Judd | |
| 6,941,465 B1 * | 9/2005 | Palekar et al. | 726/1 |
| 6,944,668 B1 | 9/2005 | Broquist et al. | |
| 7,076,083 B2 | 7/2006 | Blazey | |
| 7,240,015 B1 | 7/2007 | Karmouch et al. | |
| 7,263,353 B2 | 8/2007 | Forsberg et al. | |
| 7,269,853 B1 | 9/2007 | Dunn | |
| 7,281,137 B1 * | 10/2007 | Vitikainen | 713/189 |
| 7,324,999 B2 | 1/2008 | Judd | |
| 7,360,237 B2 | 4/2008 | Engle et al. | |
| 7,395,341 B2 | 7/2008 | Nicodemus et al. | |
| 7,428,746 B2 | 9/2008 | Engle et al. | |
| 7,428,753 B2 | 9/2008 | Engle et al. | |
| 7,444,392 B2 | 10/2008 | Rhoads | |

(Continued)

OTHER PUBLICATIONS

Condon et al., "How Secure are Networked Office Devices?", from 2011 IEEE/IFIP 41st International Conference on Dependable Systems & Networks (DSN), Jun. 2011.

(Continued)

*Primary Examiner* — Jason Chiang
(74) *Attorney, Agent, or Firm* — Van Pelt, Yi & James LLP

(57) ABSTRACT

Enforcing a policy is described. System log messages are received, via an interface, from a network device. At least a portion of the received system log messages are parsed to obtain an IP address and to obtain a user identifier. A policy to apply to a session associated with the IP address is determined, based at least in part on the user identifier. The policy is applied to the session.

21 Claims, 11 Drawing Sheets

(56) References Cited

U.S. PATENT DOCUMENTS

| | | | |
|---|---|---|---|
| 7,475,419 B1 | 1/2009 | Basu et al. | |
| 7,555,550 B2* | 6/2009 | Schunemann | 709/224 |
| 7,669,226 B2 | 2/2010 | Bhide et al. | |
| 7,818,440 B1 | 10/2010 | Givoly | |
| 7,856,652 B2 | 12/2010 | Hieda | |
| 7,962,513 B1 | 6/2011 | Boles et al. | |
| 8,000,299 B2 | 8/2011 | Lee | |
| 8,260,907 B2 | 9/2012 | O'Sullivan | |
| 8,296,820 B2 | 10/2012 | Kao et al. | |
| 8,312,507 B2 | 11/2012 | Chen et al. | |
| 8,387,110 B1 | 2/2013 | Cooper | |
| 8,423,631 B1 | 4/2013 | Mower et al. | |
| 8,516,539 B2* | 8/2013 | Kumar et al. | 726/1 |
| 8,677,447 B1 | 3/2014 | Zuk et al. | |
| 8,683,322 B1 | 3/2014 | Cooper | |
| 9,197,617 B1* | 11/2015 | Millwood | H04L 63/08 |
| 2001/0019559 A1* | 9/2001 | Handler et al. | 370/468 |
| 2003/0126613 A1 | 7/2003 | McGuire | |
| 2003/0177389 A1 | 9/2003 | Albert et al. | |
| 2005/0132060 A1 | 6/2005 | Mo et al. | |
| 2006/0075092 A1 | 4/2006 | Kidokoro | |
| 2006/0095570 A1* | 5/2006 | O'Sullivan | 709/224 |
| 2006/0212583 A1 | 9/2006 | Beadle et al. | |
| 2006/0277185 A1 | 12/2006 | Sato et al. | |
| 2006/0288003 A1* | 12/2006 | Desai et al. | 707/6 |
| 2007/0004393 A1 | 1/2007 | Forsberg et al. | |
| 2007/0073519 A1* | 3/2007 | Long | G06F 21/552 |
| | | | 702/185 |
| 2007/0226775 A1 | 9/2007 | Andreasen et al. | |
| 2008/0060064 A1 | 3/2008 | Wynn et al. | |
| 2008/0109870 A1* | 5/2008 | Sherlock et al. | 726/1 |
| 2009/0012760 A1 | 1/2009 | Schunemann | |
| 2009/0037998 A1 | 2/2009 | Adhya et al. | |
| 2009/0064300 A1 | 3/2009 | Bagepalli | |
| 2009/0192970 A1 | 7/2009 | O'Sullivan et al. | |
| 2009/0193498 A1 | 7/2009 | Agarwal et al. | |
| 2009/0249440 A1 | 10/2009 | Platt et al. | |
| 2009/0315678 A1* | 12/2009 | Padmanabhan | H04Q 9/00 |
| | | | 340/10.1 |
| 2009/0327503 A1 | 12/2009 | Hochmuth et al. | |
| 2010/0071042 A1 | 3/2010 | Hochmuth et al. | |
| 2010/0167257 A1 | 7/2010 | Norwood | |
| 2010/0235880 A1* | 9/2010 | Chen et al. | 726/1 |
| 2010/0242082 A1* | 9/2010 | Keene | G06F 21/6218 |
| | | | 726/1 |
| 2010/0287599 A1 | 11/2010 | He et al. | |
| 2010/0325717 A1 | 12/2010 | Goel et al. | |
| 2011/0264531 A1 | 10/2011 | Bhatia et al. | |
| 2012/0017085 A1 | 1/2012 | Carter et al. | |
| 2012/0078903 A1 | 3/2012 | Bergstein et al. | |
| 2012/0079454 A1 | 3/2012 | Kwan | |
| 2012/0271953 A1 | 10/2012 | Gulley et al. | |
| 2013/0086630 A1 | 4/2013 | Kavantzas | |
| 2013/0124563 A1 | 5/2013 | Cavelie et al. | |
| 2015/0143453 A1 | 5/2015 | Erb | |

OTHER PUBLICATIONS

Fisk et al., "Global Virtual Vault: Preventing Unauthorized Physical Disclosure by the Insider", from Military Communications Conference, 2008. Nov. 2008.

Rackley et al., "Multifunction Device Security Awareness", in InfoSecCD '08 Proceedings of the 5th annual conference on Information security curriculum development, pp. 51-55, Sep. 2008.

* cited by examiner

| Date-Time | Session-ID | Data |
|---|---|---|
| 2011 Oct 10 12:34:33 | XHJD93kx | CONNECT ATTEMPT from 10.0.0.5 |
| 2011 Oct 10 12:34:34 | XHJD93kx | USERNAME AliceJ@ACME.COM |
| 2011 Oct 10 12:34:35 | XHJD93kx | PASSWORD OK |
| 2011 Oct 10 12:34:36 | XHJD93kx | SESSION STARTED |
| ... | | |
| 2011 Oct 10 17:22:22 | XHJD94kx | SESSION ENDED  ⌒210 |

| Source User | Resource | Action |
|---|---|---|
| Alice.Jones | SOCIALNETWORKINGSITE132.COM | DENY |
| Marketing | PRINTER128 | ALLOW |

204 — Source User
206 — Resource

FIG. 2B

| Source User | Application | Destination | Action |
|---|---|---|---|
| Engineering Dept | SSH | ANY | ALLOW |

208 — Source User

FIG. 2C

| Source Address | Source User | Destination | Action |
|---|---|---|---|
| ANY | Engineering Dept | Bugzilla | ALLOW |
| ANY | ANY | Bugzilla | DENY |

212 — Source Address
214 — Source User

FIG. 2D

| Source | User | Resource | Action |
|---|---|---|---|
| 802 — PRINTER128 | Legal | EXTERNAL-IP | ALLOW |
| 804 — PRINTER128 | Marketing | EXTERNAL-IP | ALLOW |
| 806 — PRINTER128 | ANY | INTERNAL-IP | ALLOW |

User Identification Monitored Server  ⍰

| | |
|---:|:---|
| Name | fancy printer 1 ╱ 902 |
| Description | ╱ 904 |
| | ☑ Enabled ╱ 906 |
| Type | Syslog Sender ╱ 908 ▽ |
| Network Address | 127.0.0.2 ╱ 910 |
| Connection Type | ⦿ UDP ○ SSL ╱ 912 |
| Filter | Fancy Printer ╱ 914 ▽ |
| Default Domain Name | paloaltonetworks ╱ 916 |

[ Ok ]  [ Cancel ]

Syslog Parse Profile  ⍰

| | |
|---:|:---|
| Syslog Parse Profile | Fancy Printer ╱ 952 |
| Description | ╱ 954 |
| Type | ○ Regex Identifier  ⦿ Field Identifier ─ 956 |
| Event String | Printing Document |
| Username Prefix | User: |
| Username Delimiter | \s |
| Address Prefix | Address: |
| Address Delimiter | \s |

958

[ Ok ]  [ Cancel ]

FIG. 9B

Palo Alto Networks User ID Agent Setup

| WMI Authentication | Server Monitor | Client Probing | Cache | NTLM | Redistribution | Syslog Filters |
|---|---|---|---|---|---|---|

| | Syslog Parse Profile | Type | User | IP |
|---|---|---|---|---|
| ☐ | SSH Public Key Login | regex-identifier | (for)\s[A-Za-z0 9]+ | \d+.\d+.\d+.\d+ |
| ☐ | SSH Public Key Login Fields | field-identifier | for | from |
| ☑ | Fancy Printer | field-identifier | User: | Address: |

⊕ Add  ⊟ Delete  ⊚ Clone

[ Ok ]  [ Cancel ]

FIG. 10

USING LOG EVENT MESSAGES TO IDENTIFY A USER AND ENFORCE POLICIES

CROSS REFERENCE TO OTHER APPLICATIONS

This application is a continuation-in-part of co-pending U.S. patent application Ser. No. 13/113,939 entitled USING EVENTS TO IDENTIFY A USER AND ENFORCE POLICIES filed May 23, 2011, which is incorporated herein by reference for all purposes.

BACKGROUND OF THE INVENTION

Devices such as firewalls are sometimes used to prevent users, such as employees of a company, from accessing resources to which they are not authorized. As an example, access to a specific website or to a class of websites may be prohibited for all users. Access can also be granted in a more granular level, such as by permitting some users or groups of users to access a resource, while prohibiting access for other users/groups. Unfortunately, enforcing granular polices can be difficult, particularly as the number and variety of types of devices present in an enterprise network continue to increase.

BRIEF DESCRIPTION OF THE DRAWINGS

Various embodiments of the invention are disclosed in the following detailed description and the accompanying drawings.

FIG. 2A illustrates a representation of log data obtained from a mail server.

FIG. 2B illustrates an example of a set of policies.

FIG. 2C illustrates an example of a policy.

FIG. 2D illustrates an example of a set of policies.

FIG. 8 illustrates an example of a set of policies.

FIG. 9A illustrates an embodiment of an interface.

FIG. 9B illustrates an embodiment of an interface.

FIG. 10 illustrates an embodiment of an interface.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
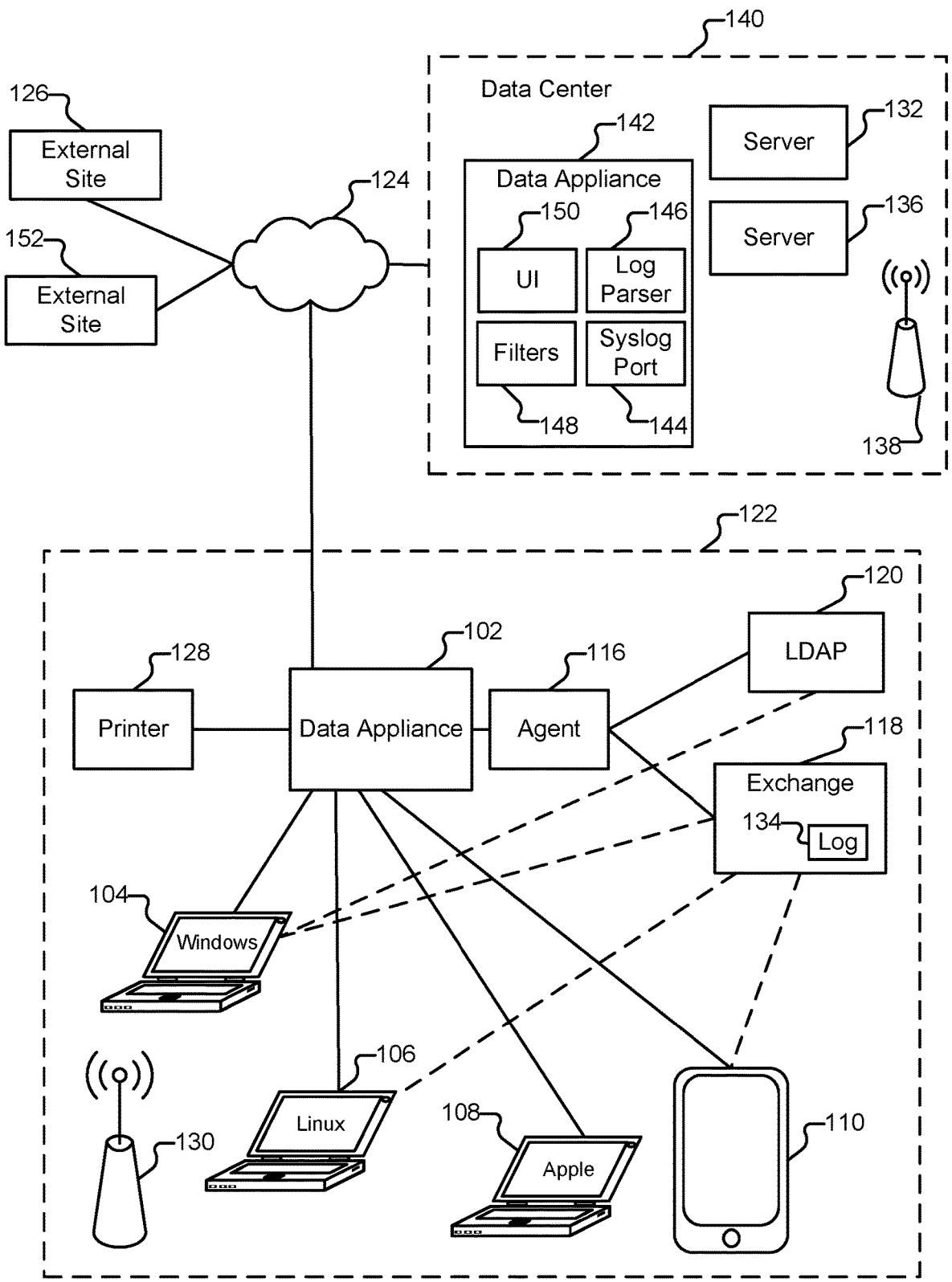
FIG. 1 illustrates an embodiment of an environment in which user identities are determined based on events (such as Microsoft Exchange events) and in which policies that incorporate the identities can be enforced.

FIG. 1 illustrates an embodiment of an environment in which user identities are determined based on events (such as Microsoft Exchange events) and in which policies that incorporate the identities are enforced. As illustrated in FIG. 1, a variety of client devices 104-110 are present in an enterprise network 122 which belongs to the ACME Corporation. Device 104 is a computer running a Windows-based operating system and is assigned to Alice. Device 106 is a computer running an Ubuntu Linux operating system and is assigned to Bob. Device 108 is a computer running the Mac OS X operating system and is also assigned to Bob. Device 110 is a tablet computer running an Android-based operating system and is personally owned by Alice, who sometimes brings the device into work with her. Device 110 is not provided to Alice by ACME Corporation. Other types of devices may also be used in conjunction with the techniques described herein, such as cellular phones/personal digital assistants, tablet computers, game consoles, and set-top boxes.

Communications between client devices 104-110 and resources outside of network 122 (e.g., external site 126 reachable via external network 124) pass through data appliance 102. Such communications may take place using any appropriate communication protocol, such as Hypertext Transfer Protocol (HTTP), Secure Sockets Layer (SSL), and File Transfer Protocol (FTP). In the example shown in FIG. 1, data appliance 102 is a firewall and is configured to enforce policies (also referred to herein as "rules") with respect to the communications it receives. Other types of devices can also be configured to provide the functionality described herein as being performed by data appliance 102. For example, a router, gateway, intrusion detection system, intrusion prevention system, or other appropriate device can be configured to perform either or both of the user identity detection functionality and policy enforcement functionality. In some embodiments, policy enforcement appliance 102 is also configured to enforce policies with respect to traffic that stays within enterprise network 122.

Also included in network 122 is a directory service provider 120 (also referred to as a domain controller), which makes use of the Lightweight Directory Access Protocol (LDAP) or other appropriate protocols. One example of a directory service provider 120 is a Microsoft Active Directory server. Other types of systems can also be used instead of directory service provider 120, such as a Kerberos-based system, and the techniques described herein adapted accordingly. Directory service provider 120 is configured to manage user identity and credential information.

Data appliance 102 uses information stored by directory service provider 120 to enforce various policies. Such policies may apply to particular devices (e.g., device 104), particular users (e.g., "Alice Jones", denoted in directory service provider 120 as the object Alice.Jones), and/or groups (e.g., "laptop devices," "employees in the Marketing Department," and "director-level employees," each of which can also be represented in directory service provider 120 as an applicable object or set of objects). As one example, a policy may specify that device 104 is permitted to send print jobs to printer 128 while device 106 may not. As another example, a policy may specify that employees in the engineering department are permitted to access external site 126, while other employees are not.

Each morning when Alice arrives at ACME Corporation and logs into her computer 104, credential information is exchanged between client 104 and directory service provider 120. Data appliance 102 is made aware of the fact that Alice has successfully logged into device 104, and is able to apply appropriate policies to Alice's communications, whether they are rules pertaining specifically to device 104, to Alice (e.g., the Alice.Jones object stored by directory service provider 120), or to a group of which Alice's object is a member (e.g., the Marketing Department). Throughout the day, Alice's computer communicates with mail server 118—a Microsoft Exchange server in the example shown in FIG. 1—to send and retrieve email messages, calendar information, and other information, as applicable.

Bob also has identity/credential information maintained by directory service provider 120. For example, included in directory service provider 120 is an object for Bob.Smith. However, as neither of Bob's computers 106 and 108 run a Microsoft-based operating system, they do not exchange credential information with directory service provider 120 when Bob logs into them. As with Alice's computer 104 however, computer 106 periodically communicates with mail server 118 to retrieve email for Bob and to send any mail authored by Bob. Bob does not use computer 108 to access Microsoft Exchange server 118.

Included in network 122 is an 802.11 wireless access point (130). Alice has configured her personal tablet 110 to make use of the access point to communicate with external sites 126 and 152. Alice has also configured her personal tablet 110 to fetch email from Microsoft Exchange server 118. As with Bob's computers 106 and 108, Alice's tablet 110 does not communicate with directory service provider 120.

Microsoft Exchange server 118 is configured to keep, in log 134, event information such as the IP address, email address, and/or other credential information of ACME employees that access the Microsoft Exchange server to retrieve and send email. As will be described in more detail below, applicable portions of the contents of log 134 can be correlated with the contents of directory service provider 120. The results of the correlation are provided to data appliance 102 and allow it to enforce user policies against devices, such as devices 106-110, even though those devices do not directly communicate with directory service provider 120.

In some embodiments, log data 134 and data from directory service provider 120 are collected and correlated by an agent application 116, which is in communication with appliance 102. The agent can be implemented in a variety of ways, such as in a device that is separate from appliance 102 (as shown in FIG. 1) or as a module collocated on appliance 102, as applicable. As will be described in more detail below, in some embodiments, the log data collected comprises syslog data. For example, data appliance 102 (or agent 116, as applicable) can be configured to act as a syslog server (e.g., by opening a UDP and/or TCP socket to listen, as a service, for syslog messages), with devices such as printer 128 and access point 130 (and/or other devices that perform authentication) providing event log information in accordance with the syslog protocol. Other logging protocols/formats can also be supported, in addition to or instead of syslog, as applicable.

Also shown in FIG. 1 is data center 140, where some of ACME Corporation's servers (e.g., servers 132 and 136) reside. From time to time, Bob visits the data center (e.g., to administer servers 132 and 136). While at the data center, he connects devices such as laptop 106 and/or laptop 108 to access point 138. In some embodiments, access to various network resources (whether at data center 140, within enterprise network 122, or external to ACME such as sites 126 and 132) by Bob are controlled by data appliance 102 using techniques described herein. In some embodiments, a second data appliance (e.g., data appliance 142 located at data center 140) controls access by Bob (while he is at the data center) to such resources. The second data appliance 142 can cooperate with data appliance 102, or operate independently of data appliance 102, as applicable, in various embodiments. Further, as will be described in more detail below, data appliance 142 can communicate with various nodes inside network 122 as applicable, such as to communicate with directory service provider 120.

FIG. 2A illustrates a representation of log data obtained from a mail server. The information shown is an abstraction of some of the types of information that can be extracted from log 134 of Microsoft Exchange server 118, in some embodiments. Other types of information may also be extracted from a log and correlated with the contents of directory service provider 120, as applicable. In the example shown, Alice's tablet computer 110, which has an IP address of 10.0.0.5, attempts to connect to server 118, provides Alice's corporate email address (AliceJ@ACME.COM), and provides Alice's correct password. A session is then successfully established between tablet 110 and server 118, allowing the tablet access to Alice's email and allowing tablet 110 the ability to send email on behalf of Alice.

The log data shown in FIG. 2A is retrieved by agent 116, which extracts pertinent information such as the date-time information, the IP address (10.0.0.5), and the email address (AliceJ@ACME.COM). Agent 116 correlates the extracted email address with information stored in directory service provider 120 to determine that the owner of the email address (AliceJ@ACME.COM) is the same individual as is represented in directory service provider 120, as object Alice.Jones. Agent 116 is thus able to determine that the user of tablet 110 (as of time 202) is Alice Jones. Agent 116 provides the information that it has learned to appliance 102 which can then enforce any applicable rules against tablet 110, and in particular, can now enforce any applicable user, group, or other appropriate rules, instead of merely enforcing device rules. In various embodiments, timeout information is also supplied by agent 116. As one example, when an indicator 210 is received that the session between tablet 110 and Microsoft Exchange server 118 has ended, agent 116 can inform appliance 102 that the mapping is no longer valid (or will cease being valid within some period of time). As another example, the mapping information determined by agent 116 is periodically automatically refreshed, instead of or in addition to agent 116 awaiting indicators, such as indicator 210, to know that a session has ended and the mapping may no longer be valid.

FIG. 2B illustrates an example of a set of policies. Suppose ACME Corporation has a policy generally allowing its employees to access social networking sites from company computers, so long as the employees do not spend an excessive amount of time on such sites or post inappropriate things to such sites. Alice was recently determined to have violated the policy (e.g., by allowing her productivity to slip). To help Alice focus on her job, without penalizing other employees such as Bob, a rule was included in data appliance 102 that prohibits Alice from accessing site 152, entirely. When Alice uses computer 104, data appliance 102 is able to determine that it is Alice using her computer (instead of another user) because Alice logs into computer 104 with the assistance of directory service provider 120. Accordingly, if Alice attempts to access site 152 using computer 104, that access would be blocked by appliance 102. If Alice were to attempt to access site 152 with her tablet 110 while at work, without the techniques described herein being deployed, it is possible that she would succeed in reaching site 152 because appliance 102 would be unaware that the tablet is being used by Alice instead of by another ACME employee. However, because data appliance 102 is able to determine a mapping between tablet 110's IP address and Alice's object within directory service provider 120, Alice's attempted access of site 152 by tablet 110 can also be prevented by appliance 102.

Figure 3:
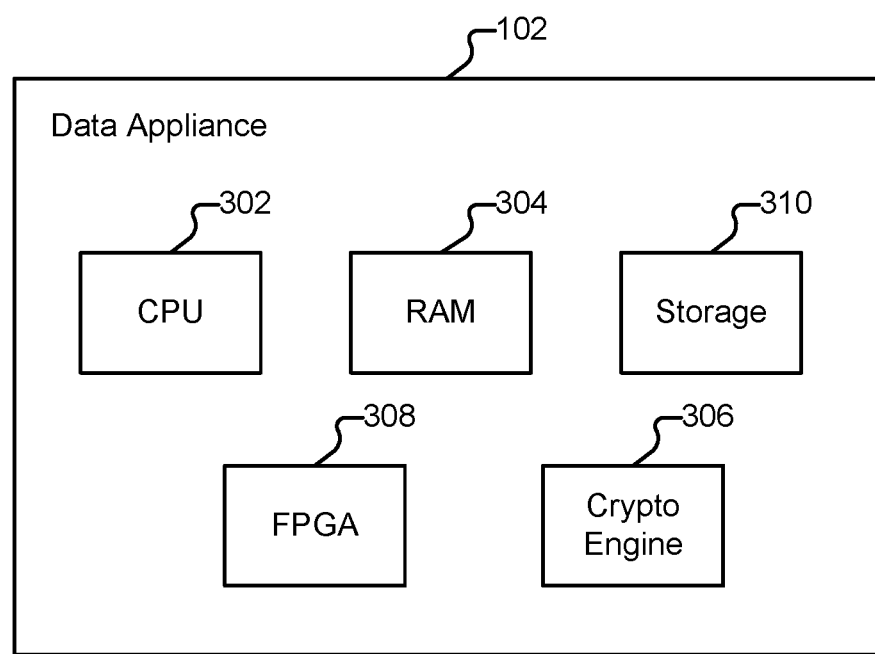
FIG. 3 illustrates an embodiment of a data appliance.

FIG. 3 illustrates an embodiment of a data appliance. The example shown is a representation of physical components that can be included in data appliance 102. Specifically, data appliance 102 includes a high performance multi-core CPU 302 and RAM 304. Data appliance 102 also includes a storage 310 (such as one or more hard disks), which is used to store policy and other configuration information. Data appliance 102 can also include one or more optional hardware accelerators. For example, data appliance 102 can include a cryptographic engine 306 configured to perform encryption and decryption operations, and one or more FPGAs 308 configured to perform signature matching, act as network processors, and/or perform other tasks.

Figure 4:
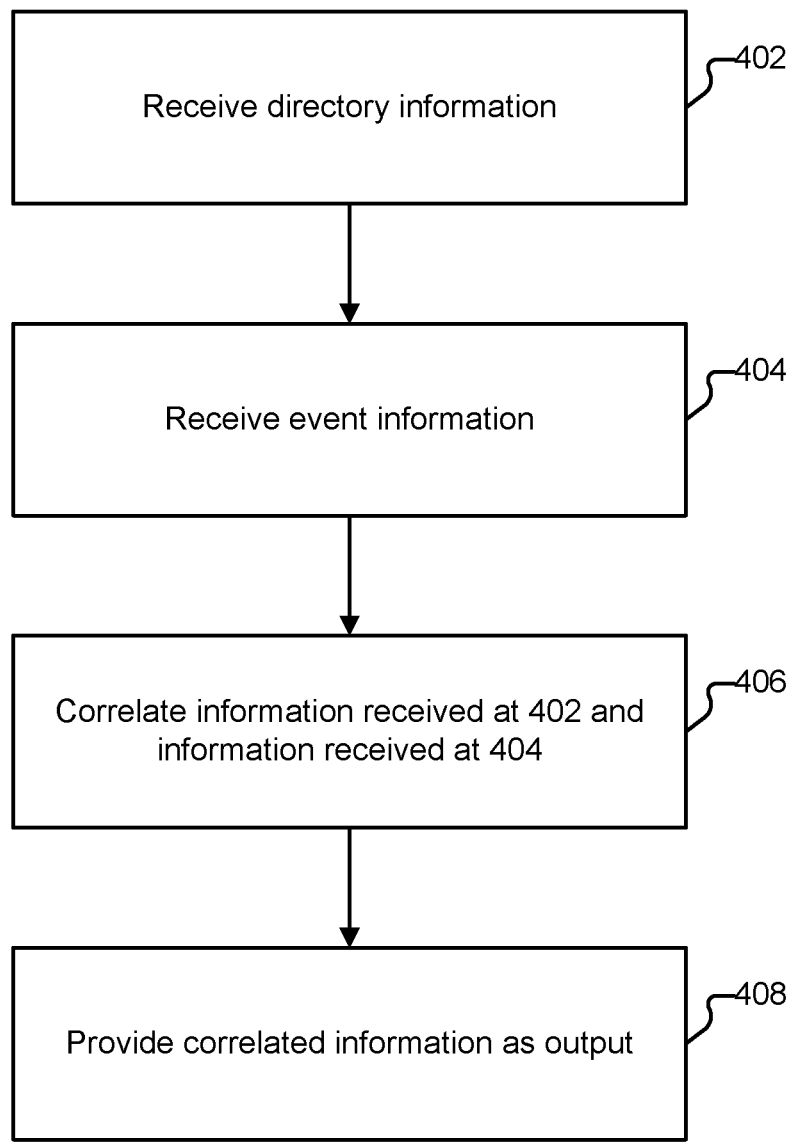
FIG. 4 illustrates an example of a process for identifying a user from an event.

FIG. 4 illustrates an example of a process for identifying a user from an event. In some embodiments, the process shown in FIG. 4 is performed by agent 116. In other embodiments, such as when the functionality of agent 116 is incorporated into appliance 102, the process shown in FIG. 4 is performed by appliance 102. The process begins at 402 when information is received from directory service provider 120. As one example, at 402, appliance 102 receives from directory service provider 120 the hierarchy of objects it stores (including the Alice.Jones object). At 404, event information is received, such as when Microsoft Exchange log 134 or portions thereof are received from Microsoft Exchange server 118. At 406, the received information is correlated. As one example, at 406, a determination is made that tablet 110 is being operated by Alice, based on the successful connection made by tablet 110 (having an IP address of 10.0.0.5) to Microsoft Exchange server 118, using Alice's credentials (AliceJ@ACME.COM and corresponding password). Finally, at 408, the correlated information (e.g., that 10.0.0.5 maps to Alice.Jones) is provided to appliance 102, so that it can enforce any applicable policies based on the correlated information and policies stored in storage 310 or loaded into RAM 304.

Additional elements can be included in the process shown in FIG. 4. One example is the receipt of initialization information (e.g., established during an initial connection between agent 116 and each of directory service provider 120 and server 118) which can be made prior to portion 402 of the process shown in FIG. 4.

Figure 5:
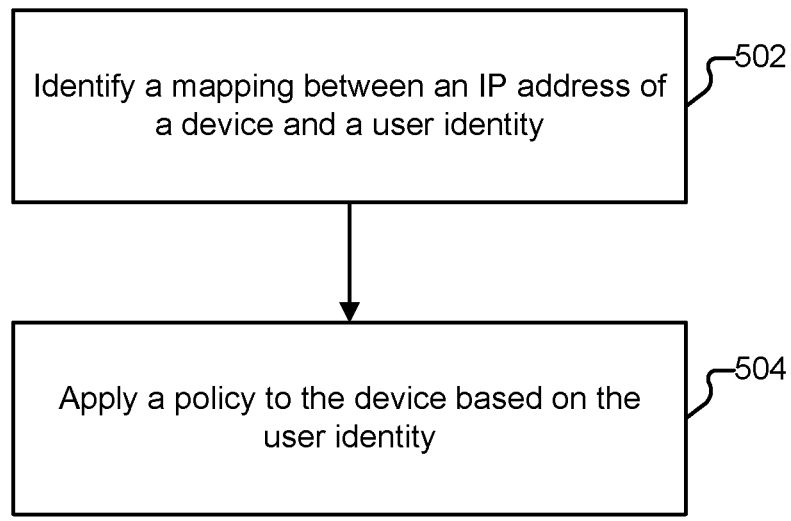
FIG. 5 illustrates an example of a process for enforcing a policy.

FIG. 5 illustrates an example of a process for enforcing a policy. In some embodiments, the process shown in FIG. 5 is performed by appliance 102. The process begins at 502 when a mapping between an IP address of a device and a user is determined. As one example, a mapping is determined when agent 116 determines that Alice is using tablet 110 and provides to appliance 102 the applicable IP address (tablet 110's IP address, 10.0.0.5) and directory service provider 120 user object (Alice.Jones). At 504, a policy is applied to the device based on the identified user identity. As one example, at 504, rule 204 of FIG. 2B would be applied to block an attempt by Alice (using either tablet 110 or computer 104) to access site 152. As another example, at 504, rule 206 of FIG. 2B would be applied to allow Alice to print to printer 128 from either computer 104 or tablet 110, because Alice is a member of the Marketing Department.

Figure 6:
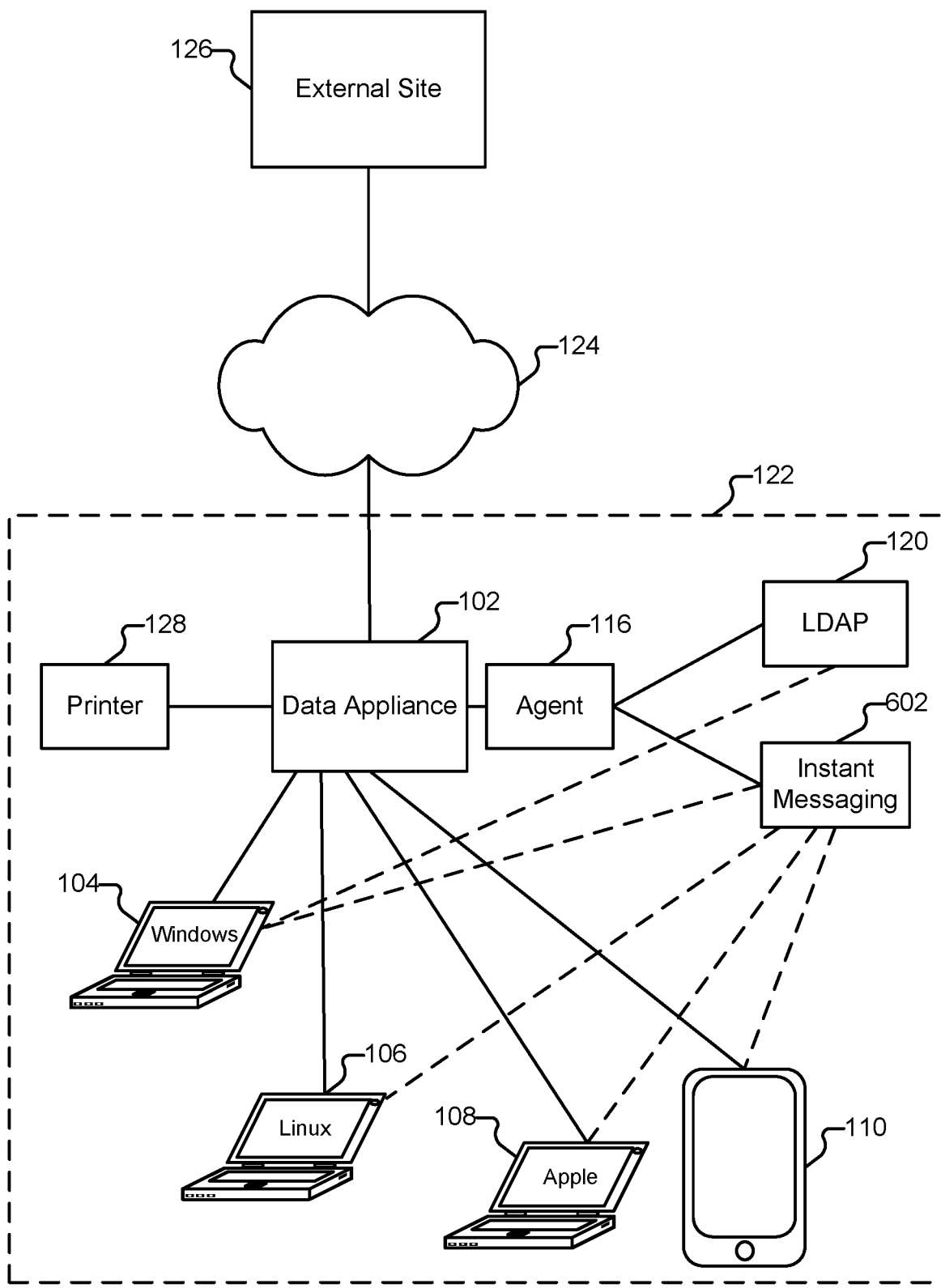
FIG. 6 illustrates an embodiment of an environment in which user identities are determined based on events (such as instant messaging events) and in which policies that incorporate the determined identities can be enforced.

FIG. 6 illustrates an embodiment of an environment in which user identities are determined based on events (such as instant messaging events) and in which policies that incorporate the determined identities can be enforced. As illustrated in the example shown in FIG. 6, user identity information can be obtained from sources other than mail servers and the techniques described herein adapted accordingly.

As one example, suppose device 108 is not used by Bob to check his corporate email (e.g., because he uses device 106 for that purpose). Bob does use computer 108 to access an enterprise instant messaging service (provided by instant messaging server 602) to communicate with other employees. Instant messaging server 602 requires its users to log in using credential information, such as a first and last name, or a corporate email address. Instant messaging server 602 also keeps event logs that include information, such as the date and time users access the instant messaging server, the credential information they supply, and whether or not access attempts are successful. In various embodiments, agent 116 is configured to retrieve the log information that is stored by instant messaging server 602 and correlate it with information stored by directory service provider 120. Server 602 (and other devices) can also be configured to transmit its logs to appliance 102 (or agent 116, as applicable) via the syslog protocol.

The correlated information can be provided to data appliance 102 and used to enforce policies, such as policy 208, shown in FIG. 2C. Specifically, policy 208 allows any ACME employee who is also a member of the Engineering Department to access any destination, so long as the access occurs using the ssh protocol. When Bob uses computer 106, his identity would be usable by data appliance 102 to enforce policy 208, due to the processes shown in FIGS. 4 and 5 being applied with respect to computer 106. When Bob uses computer 108 to communicate with instant messaging server 602, Bob's computer will also be recognized as being operated by a member of the Engineering Department (e.g., through the processes shown in FIGS. 4 and 5), and rule 208 can be applied to computer 108 to permit Bob to access site 126 using ssh (whereas, without the processing being performed, Bob might otherwise be required to use computer 106 for the same purpose).

Another set of policies that can be enforced is shown in FIG. 2D. Specifically, the rules permit members of the Engineering Department to access a bug tracking system (212), while denying access to the bug tracking system to everyone else (214). When Bob uses computer 106 to access his email (or 108 for instant messaging purposes), his identity would be usable by data appliance 102 to enforce policy 212 due to the processes shown in FIGS. 4 and 5 being applied with respect to computers 106 and/or 108, and without either of those computers needing to directly communicate with directory service provider 120.

Figure 7:
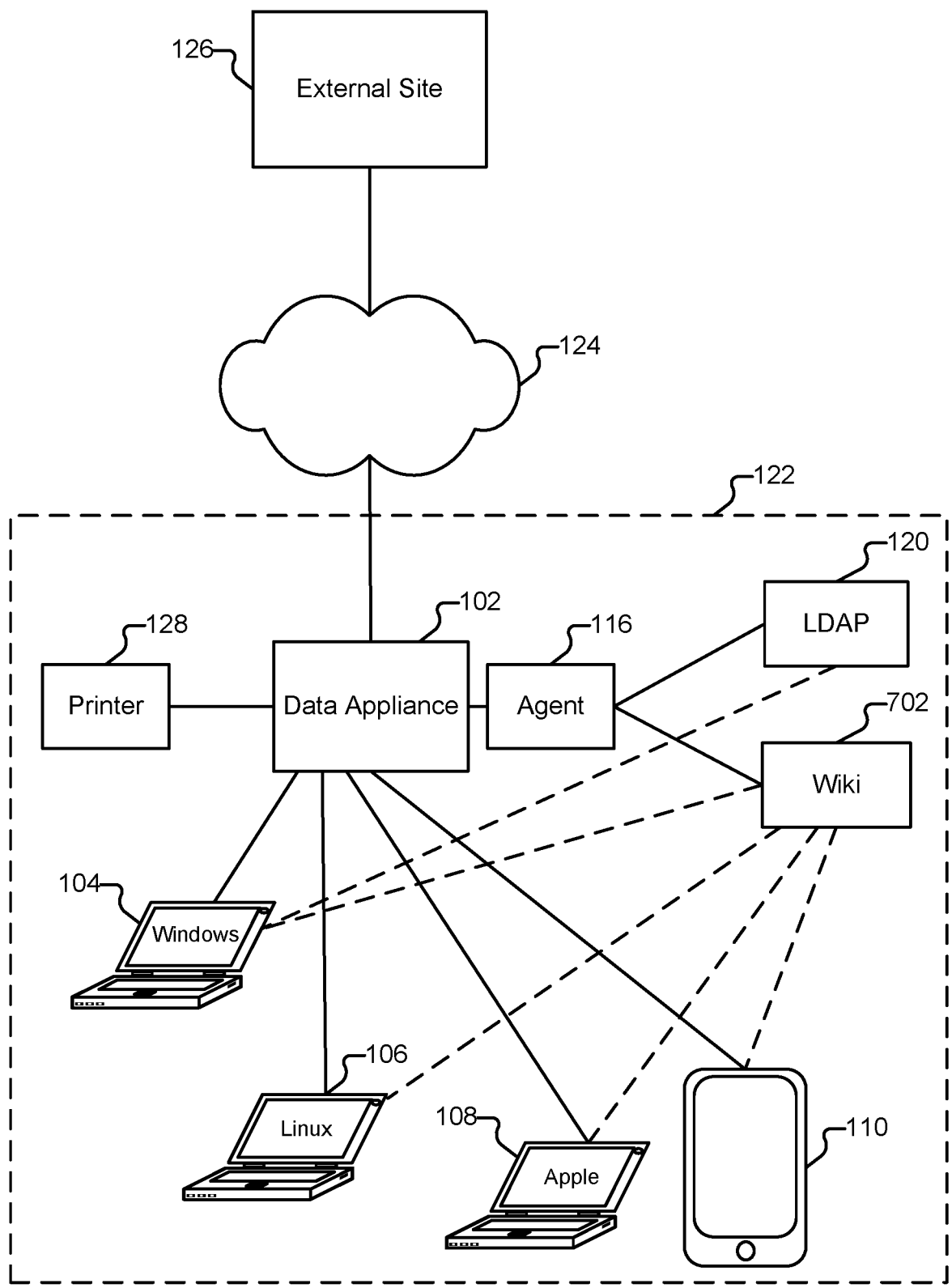
FIG. 7 illustrates an embodiment of an environment in which user identities are determined based on events (such as collaborative editing events) and in which policies that incorporate the determined identities can be enforced.

FIG. 7 illustrates an embodiment of an environment in which user identities are determined based on events (such as collaborative editing events) and in which policies that incorporate the determined identities can be enforced. As illustrated in the example shown in FIG. 7, user identity information can be obtained from sources other than mail servers and the techniques described herein adapted accordingly.

As one example, suppose device 108 is not used by Bob to check his corporate email (e.g., because he uses device 106 for that purpose). Bob does use computer 108 to access a collaborative website (an enterprise Wiki 702) to collaborate with other employees on documentation. Wiki 702 requires its users to log in using credential information, such as a first and last name, or a corporate email address. Wiki 702 also keeps event logs that include information, such as the date and time users access the Wiki, the credential information they supply, and whether or not access attempts are successful. In various embodiments, agent 116 is configured to retrieve the log information that is stored by Wiki 702 and correlate it with information stored by directory service provider 120. The log information can also be transmitted to appliance 102 (or agent 116 as applicable) via the syslog protocol. The correlated information can be provided to data appliance 102 and used to enforce policies, such as policy 208, shown in FIG. 2C. When Bob uses computer 108 to communicate with Wiki 702, Bob's computer will be recognized as being operated by a member of the Engineering Department (e.g., through the processes shown in FIGS. 4 and 5), and rule 208 can be applied to computer 108 to permit Bob to access site 126 using ssh (whereas, without the processing being performed, Bob might not otherwise be required to use computer 106 for the same purpose).

Additional Example: Access Point

The following example refers to the environment depicted in FIG. 1. Suppose Bob visits data center 140 Monday morning to perform maintenance on server 132. He brings laptop 106 with him to the data center, as well as a personal tablet device he purchased over the weekend.

In this example, access point 138 supports 802.1X. In order to connect to access point 138 with each of his two devices, Bob provides appropriate credentials (e.g., username=Bob.Smith and password=kjw2skjdfw235) to access point 138 (whether via a captive portal made available by access point 138, a configuration file stored on the respective device, etc.). In some embodiments, access point 138 is configured to verify the provided credential information with directory service provider 120 (i.e., the credentials required to authenticate to access point 138 are his corporate credentials). Access point 138 can also be configured to compare provided credential information against information stored locally on access point 138 (which can be periodically refreshed by directory service provider 120, can be a locally configured data set of different credentials, or can otherwise be made available to access point 138 for making authorization decisions, as applicable). Access point 138 is further configured to forward system log messages (e.g., using the syslog protocol) to data appliance 142. Access point 138 can also be configured to forward system log messages to data appliance 102 (and/or can be configured to forward system log messages to agent 116) and the techniques described herein adapted accordingly.

When Bob attempts to and then successfully authenticates to access point 138 (whether using his corporate credentials or a different set of credentials), one or more events are created in one or more logs stored on access point 138. The log(s) are in turn forwarded by access point 138 to a configured syslog server (e.g., running as a daemon on data appliance 142 and accessible via port 144). In various embodiments, port 144 is TCP/UDP port number 514. In the 802.1X protocol, the username and the IP address are included in the log in plaintext and thus can be parsed.

When appliance 142 receives the syslog messages associated with Bob's successful authentication to access point 138, appliance 142 parses the messages (using log parser 146) and extracts information such as his authenticated username and the IP address his device was assigned after the successful authentication. Appliance 142 (and/or appliance 102) can then immediately begin applying policies to Bob's devices for the session—and, in some embodiments, before Bob's devices have sent a single packet in conjunction with their respective sessions. As one example, appliance 142 can be configured with a rule that only permits traffic to server 136 from "corporate known users" of network 122 (e.g., those users who have successfully authenticated against directory service provider 120, irrespective of their specific user identity). Additional rules can further restrict access based on user/group membership (e.g., just certain users, or users belonging to certain groups). Further, in some embodiments, information such as the type of device (e.g., tablet vs. laptop) from which the authentication request originated is also parsed (e.g., out of the 802.1X log forwarded by access point 138) and is also used in enforcing policies.

As explained above, access point 138 can also be configured to forward logs to data appliance 102 (i.e., to forward the logs outside the data center and into appliance 102). Appliance 102 can similarly parse the messages received via its own syslog port, extract user identifier/IP address information associated with Bob, and begin applying policies to any traffic associated with Bob that enters or leaves network 122. Further, while the logs in the above example are described as being forwarded by access point 138 to data appliance 142, such logs could instead (or in addition) be received from the directory service provider used in conjunction with the authentication. (E.g., directory service provider 120, or any other appropriate source of authentication information, such as a corporate Remote Authentication Dial In User Service (RADIUS) server or Terminal Access Controller Access-Control System (TACACS)).

As will be described in more detail below, user identifier information and IP address information can be extracted from the received syslog messages using a set of filters 148 (e.g., regular expressions and/or field identifiers) variously tailored for the type of log received. For example, the manufacturer of appliance 142 can make available an updatable library of filters applicable to various commonly available devices (e.g., access points sold by various vendors). Also as will be described in more detail below, the filters stored on appliance 102 can be updated by the manufacturer of appliance 102 (e.g., as part of a nightly or weekly update) and can also be customized by an administrator of appliance 102 (e.g., an ACME Corporation employee) via interface 150.

Additional Example: Multi-Function Device

The techniques described herein can be used in conjunction with a variety of types of devices, manufactured by a variety of vendors. In the following example, suppose printer 128 is a multi-function device (e.g., it can be used to copy documents, print documents, FAX documents, and email scanned documents).

Suppose ACME Corporation has recently had a problem with employees emailing scanned copies of corporate-confidential materials outside of ACME Corporation, in violation of corporate policy. Suppose also that certain individuals, such as members of the legal department, and members of the marketing department (e.g., Alice) have legitimate reasons to email such scanned documents to recipients outside of network 122. One approach ACME Corporation could take is to move printer 128 to a secured room in the ACME building and provide physical keys to members of the legal/marketing departments. A second approach is for ACME to implement a rule in data appliance 102 similar to rule 206 (adding an additional, similar rule with respect to the legal department). A third approach is as follows.

Suppose that printer 128 is configured such that in order for a potential user of the printer to scan, copy, or FAX a document, that user must first wave an ACME-issued Radio-Frequency Identification (RFID) badge in front of a badge reader connected to the printer. In some embodiments, the badge reader is configured to communicate with directory service provider 120 (which stores, for each user object, the badge identifier associated with the user). In other embodiments, the badges are registered with a directory service that is separate from directory service provider 120. For example, the printer may maintain a local list of badge identifiers or may communicate with a separate device that maintains such information. The badge reader infrastructure can be provided by the printer manufacturer (i.e., as part of the particular printer model or as an additional kit) and can also be provided by a third party. Printer 128 supports the syslog protocol and is configured to forward its logs to appliance 102 (or agent 116, as applicable).

When a potential user of printer 128 waves a badge in front of the badge reader, the identifier of the badge is read by the RFID reader and either transmitted to directory service provider 120 for authentication, or otherwise compared against authorized badge information (e.g., locally stored). Log entries will also be created locally on the printer and can be forwarded to the syslog daemon running on appliance 102 (or agent 116, as applicable). Log entries can also be forwarded to the syslog by directory service provider 120, if applicable.

Appliance 102, upon receipt of the printer-related log entries, can enforce a variety of policies applicable to a variety of types of users and printer functions. As one example, rules with respect to the destination of traffic originating at the printer can be enforced, with respect to various groups of users, as illustrated in FIG. 8.

FIG. 8 illustrates an example of a set of policies. The first policy (802) allows any member of the legal department to use printer 128 to send data to external IP addresses (i.e., those IP addresses outside of network 122). The second policy (804) similarly allows any member of the marketing department to use printer 128 for the same purpose. No other users (i.e., those not belonging to either the legal or marketing group) will be able to use printer 128 to transmit data outside of ACME. However, due to the final policy (806) all ACME employees will be able to use printer 128 for all purposes internally. In this example, a policy match is required, and any activity not conforming to a listed policy will be denied. Thus, Bob in the engineering department can scan and send documents to other employees, but if he attempts to send documents outside the corporate network (122) using printer 128, the traffic will be blocked by data appliance 102. As explained above, more granular rules can also be included, for example, allowing only specific individuals (rather than entire departments) the ability to send scanned documents offsite.

Note that in this example, printer 128 does not (and need not) support 802.1X in order for user-group specific policies to be applied. Identity information pertaining to the authenticated user (e.g., the username/group associated with the badge) is obtained from syslog message information, as is the IP address of the device (in this case, the IP address of the printer, rather than, for example, the IP address of a device authenticating to a wireless access point). Using the techniques described herein, data appliances 102 and 142 can enforce user-group specific policies based on syslog messages received from a wide range of applications/devices, including custom applications/devices (e.g., appearing only within the ACME network). Example interfaces for configuring a data appliance (e.g., appliance 142) will now be described.

FIG. 9A illustrates an embodiment of an interface. Interface 900 is an example of a screen that can be presented to an administrator of data appliance 102 (e.g., via a user interface) when setting up a particular device for syslog information extraction. In the example shown, the administrator is adding printer 128 (named "fancy printer 1") (902). The administrator can add a description of the device in area 904, can enable or disable the device in area 906, and specify that the device will send syslogs in region 908. The address of printer 128 is provided in area 910. The connection type is specified in area 912. In region 914, the parse profile to be used on logs received from the device is specified (described in more detail in conjunction with FIG. 9B). Finally, in region 916, a default domain name (if applicable) is specified.

FIG. 9B illustrates an embodiment of an interface. Interface 950 is an example of a screen that can be presented to an administrator of data appliance 102 (e.g., via a user interface) when setting up filters usable in conjunction with enforcing policies with respect to one or more types of devices. In the example shown, the administrator is reviewing the parse profile used for printer 128. The parse profile can be used by multiple devices as applicable, e.g., which generate logs having similar structure.

Region 952 shows the name of the parse profile—the same as appears at 914 in interface 900. The administrator can specify a description of the parse profile in region 954. In region 956, the administrator specifies whether the parse profile should extract user identifier/IP information based on field matching or regular expressions. In this example, field identifiers are used. The remainder of the interface (958) provides instructions on how to parse user identifier/IP information out of the log. Specifically, when a log line including the event string "Printing Document" is received from printer 128, the username of the user is prefaced with "User:" and delimited with "\s" while the IP address is prefaced with "Address:" and also delimited with "\s".

FIG. 10 illustrates an embodiment of an interface. Interface 1000 is an example of a screen that can be presented to an administrator of data appliance 102 (e.g., via a user interface) when setting up filters usable in conjunction with enforcing policies with respect to one or more types of devices. In the example shown, the administrator has finished configuring the parse profile for printer 128 and is reviewing the set of parse profiles configured on appliance 102. In addition to a profile for parsing logs forwarded by printer 128, two additional parse profiles (one using regular expressions and one using field identifiers), with respect to ssh logins, are included. The ssh parse profile can be used with respect to any Linux server running openssh at ACME that is configured to send logs to appliance 102 via syslog. Specifically, the parse rules indicate how to watch for a successful ssh login on a given server, and how to parse the username and IP address from the received ssh logs.

A library of devices/parse profiles can be provided (e.g., by the manufacturer of appliance 102) to appliance 102 for use by an administrator. Regular updates to the library can be made, e.g., as content updates (instead of/in addition to software updates). Further, also as explained above, an administrator or other appropriate individual can create custom devices/types and supply custom parse profiles, e.g., using interfaces 900 and 950. This allows appliance 102 to enforce user-group specific policies against traffic originating from/destined for a wide array of devices. Additional examples of such devices which can be configured to forward system log messages to appliance 102 include wireless controllers, proxy servers, switches, and virtually any other type of device which supports syslog and performs authentication.

In various embodiments, one or more checks is performed with respect to administrator-provided parsing profiles. As one example, the portion of the log indicated as being an address can be checked to make sure it is in conformance with ipv4 and/or ipv6 syntax. The checking can be performed at the time the parse profile is created (or updated), e.g., by asking the user to provide sample log data, and/or can also be performed in conjunction with parsing during active use of the system. As another example, a check can be performed by appliance 102 that an extracted IP address is an addressable address.

Figure 11:
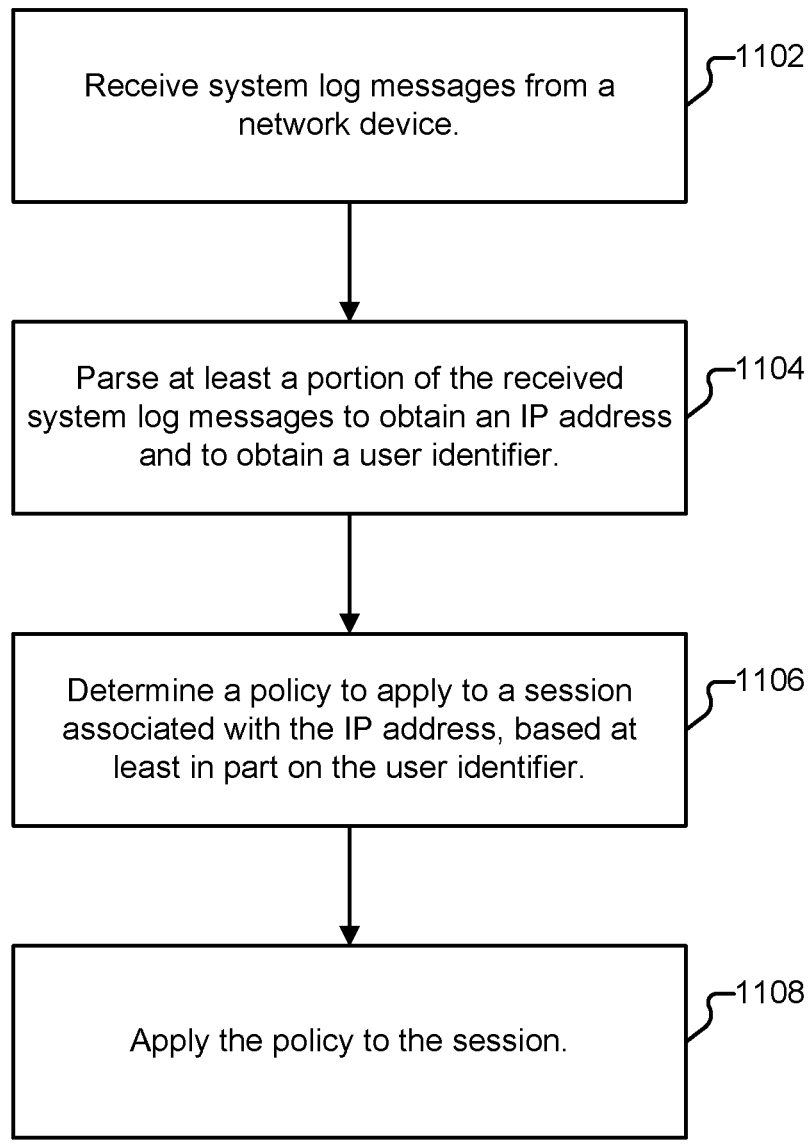
FIG. 11 illustrates an example of a process for identifying a user from an event.

FIG. 11 illustrates an example of a process for identifying a user from an event. In some embodiments, the process shown in FIG. 11 is performed by agent 116. In other embodiments, such as when the functionality of agent 116 is incorporated into appliance 102, the process shown in FIG. 11 is performed by appliance 102. The process can also be performed on other data appliances (or agents in communication with other data appliances, as applicable) such as data appliance 142.

The process begins at 1102 when system log messages are received from a device (e.g., a network device). As one example, system log messages are received by appliance 142 from access point 138 when Bob successfully authenticates using 802.1X. As another example, system log messages are received by appliance 102 from printer 128 when Alice successfully uses her badge at the badge reader attached to printer 128.

At 1104, the received log messages are parsed to obtain an IP address and a user identifier. As explained above, a combination of Bob's user identifier and the IP address assigned to his device (e.g., laptop or tablet) is obtainable from the corresponding log (using the appropriate parse profile). A combination of Alice's user identifier and the IP address of printer 128 are similarly obtainable from the corresponding log (using the appropriate parse profile). At 1106, a policy to be applied to a session associated with the IP address is determined based at least in part on the user identifier. As one example, a determination is made that as a verified user, Bob can now communicate with server 136. As another example, a determination is made that Alice (as a member of the marketing department) can now scan documents and have printer 128 email them out of network 122. Finally, at 1108, the policy is applied to the session. For example, packets from Bob's device will be allowed to arrive at server 136. As another example, packets from printer 128 (being operated by Alice) will be allowed outside of network 122.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, from a first device, at least one system log message generated at the first device, wherein the system log message is compatible with syslog and comprises at least one event string associated with a user interaction with the first device, and wherein the event string includes a field value associated with a first user identifier, wherein the first user identifier is stored in a first credential repository accessible to the first device, and wherein the first device provides a plurality of services, including at least one network function that facilitates communication between the first device and a resource, and at least one non-network function;
obtain the field value using the received system log message, at least in part by parsing at least a portion of the received system log message using a log parser in conjunction with a parse profile, wherein the parse profile indicates how to parse the field value;
use the obtained field value as a query to a directory service that is different from the first credential repository to obtain a second user identifier that is different from the first user identifier;
determine a policy to apply to a session between the first device and the resource based at least in part on the determined second user identifier, wherein determining the policy to apply to the session includes determining a policy applicable to a group associated with the second user identifier; and
apply the policy to the session, wherein applying the policy to the session includes: (1) permitting use of both the network function and non-network function when the second user identifier is associated with a first individual and (2) denying use of the network function but permitting use of the non-network function when the second user identifier is associated with a second individual; and
a memory coupled to the processor and configured to provide the processor with instructions.

2. The system of claim 1 wherein determining the policy includes determining a policy applicable to a user associated with the second user identifier.

3. The system of claim 1 wherein the parse profile comprises one or more field identifiers to be located in the system log message.

4. The system of claim 1 wherein the parse profile comprises one or more regular expressions to be applied to the system log message.

5. The system of claim 1 wherein the processor is further configured to evaluate a syntax of the parse profile for malformations.

6. The system of claim 1 wherein at least one event string associated with the user interaction with the first device includes Radio-Frequency Identification (RFID) tag information.

7. The system of claim 1 wherein applying the policy to the session includes selectively allowing access to the resource based on a location of the resource.

8. The system of claim 1 wherein applying the policy to the session includes permitting local use of the first device and preventing access to the resource by the first device.

9. The system of claim 1 wherein applying the policy to the session includes selectively allowing the network function based on whether the resource is an internal or external resource.

10. A method, comprising:
receiving, from a first device, at least one system log message generated at the first device, wherein the system log message is compatible with syslog and comprises at least one event string associated with a user interaction with the first device, and wherein the event string includes a field value associated with a first user identifier, wherein the first user identifier is stored in a first credential repository accessible to the first device, and wherein the first device provides a plurality of services, including at least one network function that facilitates communication between the first device and a resource, and at least one non-network function;
obtaining the field value using the received system log message, at least in part by parsing at least a portion of the received system log message using a log parser in conjunction with a parse profile, wherein the parse profile indicates how to parse the field value;
using the obtained field value as a query to a directory service that is different from the first credential repository to obtain the first user identifier;
determining a policy to apply to a session between the first device and the resource based at least in part on the determined second user identifier, wherein determining the policy to apply to the session includes determining a policy applicable to a group associated with the second user identifier; and
applying the policy to the session, wherein applying the policy to the session includes: (1) permitting use of both the network function and non-network function when the second user identifier is associated with a first individual and (2) denying use of the network function but permitting use of the non-network function when the second user identifier is associated with a second individual.

11. The method of claim 10 wherein determining the policy includes determining a policy applicable to a user associated with the second user identifier.

12. The method of claim 10 wherein the parse profile comprises one or more field identifiers to be located in the system log message.

13. The method of claim 10 wherein the parse profile comprises one or more regular expressions to be applied to the system log message.

14. The method of claim 10 further comprising evaluating a syntax of the parse profile for malformations.

15. The method of claim 10 wherein at least one event string associated with the user interaction with the first device includes Radio-Frequency Identification (RFID) tag information.

16. The method of claim 10 wherein applying the policy to the session includes selectively allowing access to the resource based on a location of the resource.

17. The method of claim 10 wherein applying the policy to the session includes permitting local use of the first device and preventing access to the resource by the first device.

18. The method of claim 10 wherein applying the policy to the session includes selectively allowing the network function based on whether the resource is an internal or external resource.

19. A computer program product embodied in a non-transitory computer readable storage medium and comprising computer instructions for:
receiving, from a first device, at least one system log message generated at the first device, wherein the system log message is compatible with syslog and comprises at least one event string associated with a user interaction with the first device, and wherein the event string includes a field value associated with a first user identifier, wherein the first user identifier is stored in a first credential repository accessible to the first device, and wherein the first device provides a plurality of services, including at least one network function that facilitates communication between the first device and a resource, and at least one non-network function;
obtaining the field value using the received system log message, at least in part by parsing at least a portion of the received system log message using a log parser in conjunction with a parse profile, wherein the parse profile indicates how to parse the field value;
using the obtained field value as a query to a directory service that is different from the first credential repository to obtain the first user identifier;
determining a policy to apply to a session between the first device and the resource based at least in part on the determined second user identifier, wherein determining the policy to apply to the session includes determining a policy applicable to a group associated with the second user identifier; and
applying the policy to the session, wherein applying the policy to the session includes (1) permitting use of both the network function and non-network function when the second user identifier is associated with a first individual and (2) denying use of the network function but permitting use of the non-network function when the second user identifier is associated with a second individual.

20. The computer program product of claim 19 wherein the parse profile comprises one or more field identifiers to be located in the system log message.

21. The computer program product of claim 19 wherein at least one event string associated with the user interaction with the first device includes Radio-Frequency Identification (RFID) tag information.

* * * * *